United States Patent
Kunkel et al.

(10) Patent No.: US 7,047,365 B2
(45) Date of Patent: May 16, 2006

(54) CACHE LINE PURGE AND UPDATE INSTRUCTION

(75) Inventors: Steven R. Kunkel, Rochester, MN (US); David Arnold Luick, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 478 days.

(21) Appl. No.: 10/054,042

(22) Filed: Jan. 22, 2002

(65) Prior Publication Data
US 2003/0140199 A1 Jul. 24, 2003

(51) Int. Cl.
*G06F 12/00* (2006.01)

(52) U.S. Cl. .............. 711/141; 711/135; 711/143; 711/155; 711/163

(58) Field of Classification Search ........... 711/141, 711/143, 163, 156, 135
See application file for complete search history.

(56) References Cited

U.S. PATENT DOCUMENTS

| | | | | |
|---|---|---|---|---|
| 5,210,848 A | * | 5/1993 | Liu | 711/124 |
| 5,586,297 A | * | 12/1996 | Bryg et al. | 711/143 |
| 6,189,078 B1 | * | 2/2001 | Bauman et al. | 711/156 |
| 6,549,959 B1 | * | 4/2003 | Yates et al. | 710/22 |
| 6,594,736 B1 | * | 7/2003 | Parks | 711/151 |
| 6,675,316 B1 | * | 1/2004 | Harper | 714/4 |
| 6,829,683 B1 | * | 12/2004 | Kuskin | 711/145 |
| 2003/0079085 A1 | * | 4/2003 | Ang | 711/122 |
| 2003/0195939 A1 | * | 10/2003 | Edirisooriya et al. | 709/212 |

OTHER PUBLICATIONS

IBM Technical Disclosure Bulletin, Purging Shared Cache lines in a MUlti-Processor Node, Nov. 1993, IBM, vol. 36, pp. 1-6.*

* cited by examiner

*Primary Examiner*—Mano Padmanabhan
*Assistant Examiner*—Mehdi Namazi
(74) *Attorney, Agent, or Firm*—Patterson & Sheridan LLP

(57) ABSTRACT

A method and apparatus for purging a cache line from an issuing processor and sending the cache line to the cache of one or more processors in a multi-processor shared memory computer system. The method and apparatus enables cache line data to be moved from one processor to another before the receiving processor needs the data thus preventing the receiving processor from incurring a cache miss event.

28 Claims, 3 Drawing Sheets

CACHE LINE PURGE AND UPDATE INSTRUCTION

BACKGROUND OF THE INVENTION

1. Field of the Invention

The present invention generally relates to multiple processor shared memory computer systems and more specifically to managing cache memory in such systems.

2. Description of the Related Art

Users of data processing systems continue to demand greater performance for handling increasingly complex and difficult tasks. Greater performance from the processors that operate such systems may be obtained through faster clock speeds so the individual instructions are processed more quickly. However, processing speed has increased much more quickly than the speed of main memory. Despite the speed of a processor, a bottleneck on computer performance is that of transferring information between the processor and memory. Therefore, cache memories, or caches, are often used in many data processing systems to increase performance in a relatively cost-effective manner.

A cache is typically a relatively faster memory that is intermediately coupled between one or more processors and a bank of slower main memory. Cache speeds processing by maintaining a copy of repetitively used information in its faster memory. Whenever an access request is received for information not stored in cache, the cache typically retrieves the information from main memory and forwards the information to the processor. If the cache is full, typically the least recently used information is discarded or returned to main memory to make room for more recently accessed information.

The benefits of a cache are realized whenever the number of requests to address locations of cached information (known as "cache hits") are maximized relative to the number of requests to memory locations containing non-cached information (known as "cache misses"). Despite the added overhead that occurs as a result of a cache miss, as long as the percentage of cache hits is high (known as the "hit rate"), the overall processing speed of the system is increased.

Illustratively, one method of increasing the hit rate for a cache is to increase the size of the cache. However, cache memory is relatively expensive and is limited by design constraints, particularly if the cache is integrated with a processor on the same physical integrated circuit.

As an illustration, one cost-effective alternative is to chain together multiple caches of varying speeds. A smaller but faster primary cache is chained to a relatively larger but slower secondary cache. Furthermore, instructions and data may be separated into separate data and instruction caches. Illustratively, some processors implement a small internal level one (L1) instruction cache with an additional external level two (L2) cache, and so on.

Shared-memory multiprocessor systems present special issues regarding cache implementations and management. In shared-memory multiprocessor systems, all processors can access all memory including main and cache memory. This enables the tasks on all of the processors to efficiently and easily share data with one another. However, this sharing must be controlled to have predictable results. Conventionally, shared memory multiprocessor systems have hardware that maintains cache coherence and provides software instructions that can be used to control which processor is writing to a particular memory location. In order to prevent multiple processors from storing to the same memory location (or cache line) at the same time, most shared memory multiprocessors use a snoop-invalidate cache protocol to allow a processor to write data to a memory location (or cache line) only if it has an exclusive copy of the cache line containing the memory location.

In a system with a large number of processors, the next processor to read and/or write to a memory location is often not the processor that has the cache line stored in the cache associated with that processor. This requires the cache line to be moved between the caches of different processors. Efficiently moving cache lines to other caches is critical to multiprocessor systems.

On a shared-memory multiple processor system with 16 megabytes of level two (L2) cache per processor, about forty percent of the cache misses are due to reading and/or writing of shared data. Making the cache larger or adding additional levels of cache does not reduce the amount of cache misses. Instead, the result is the percentage of cache misses become larger with a larger cache and movement of the cache lines between caches reduces the performance of multiple processor systems.

Therefore, there is a need for a mechanism that will reduce the amount of cache misses in shared-memory multiple processor systems and improve overall system performance.

SUMMARY OF THE INVENTION

The present invention generally provides a method and apparatus for purging a cache line and sending the purged cache line to the cache of one or more other processors in a shared-memory multiple processor computer system.

In one embodiment, a cache line purge instruction configures a processor to purge a cache line from the processor and sends the cache line to at least one of a plurality of processors in the computer system to update the at least one of a plurality of processors.

In another embodiment, the cache line purge instruction, when executed by a processor, updates all processors in the computer system.

In yet another embodiment, the cache line purge instruction updates only the oldest cache line in the computer system.

In still another embodiment, the cache line purge instruction updates only one cache at a designated processor, marks the updated cache line state as exclusive and marks the state of the cache of the processor executing the instruction as temporarily invalid.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides a processor instruction that purges a cache line from an issuing processor and sends the purged cache line to the cache of one or more other processors in a shared-memory multiple processor system. The instruction enables the data contained in the purged cache line to be moved to one or more other processors before the other processor(s) need the data.

One embodiment of the invention is implemented as a program product for use with a computer system such as, for example, the computer system show in FIG. 1 and described below. The program(s) of the program product defines functions of the embodiments (including the methods described below with reference to FIGS. 2, 3 and 4) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be implemented as part of an operating system or a specific application, component, program, module, object, or sequence of instructions. The inventive computer program is typically comprised of a multitude of instructions that will be translated by the native computer into a machine-readable format and hence executable instructions. In addition, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
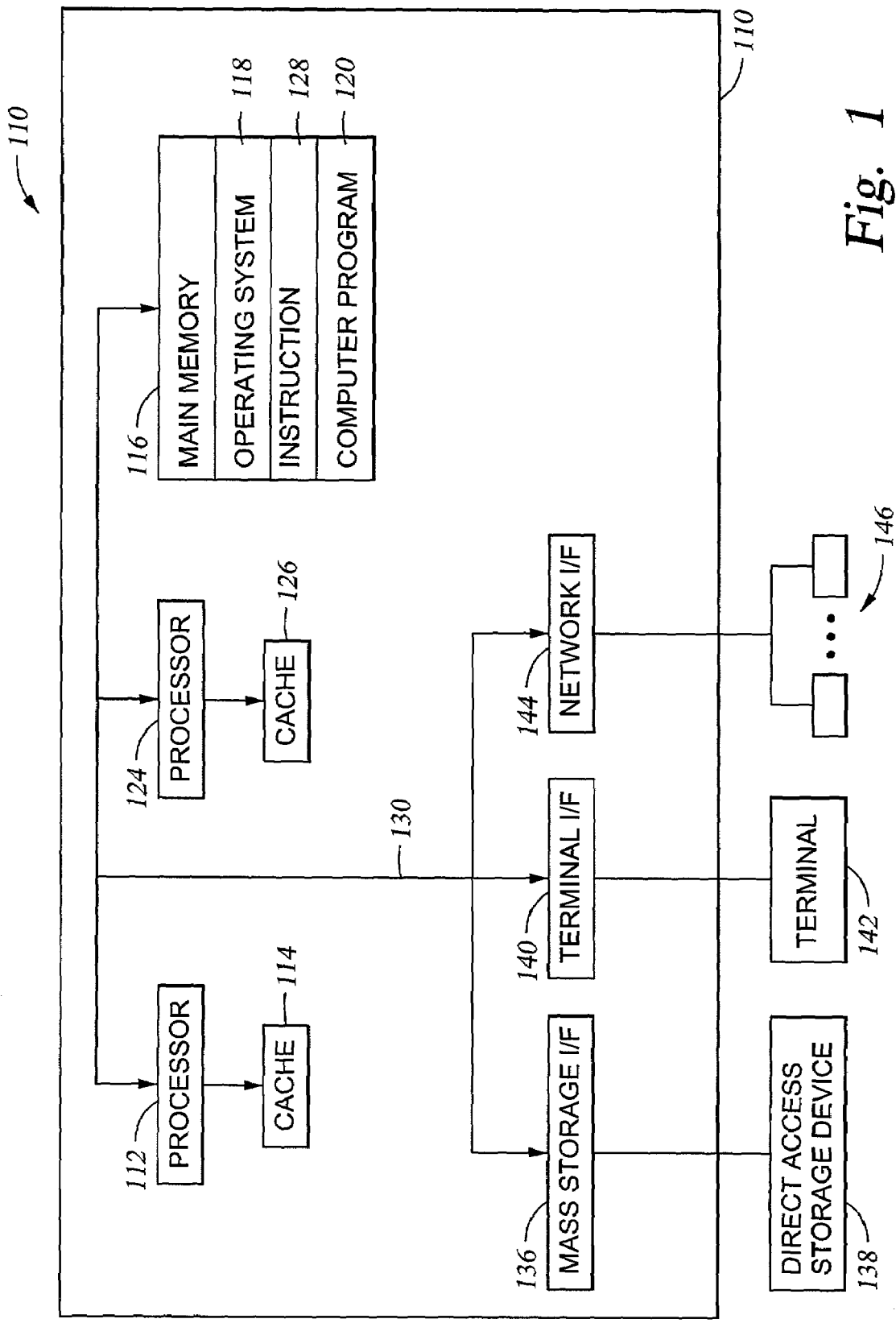
FIG. 1 is a block diagram of a computer system consistent with the invention.

Referring now to FIG. 1, a computer system 110 consistent with the invention is shown. For purposes of the invention, computer system 110 may represent any type of computer, computer system or other programmable electronic device, including a client computer, a server computer, a portable computer, a minicomputer, a midrange computer, a mainframe computer, an embedded controller, etc. adapted to support the methods, apparatus and article of manufacture of the invention. The computer system 110 may be a standalone device or networked into a larger system. In one embodiment, the computer system 110 is an eServer iSeries computer available from International Business Machines of Armonk, N.Y.

The computer system 110 could include a number of operators and peripheral systems as shown, for example, by a mass storage interface 136 operably connected to a direct access storage device 138, by a terminal interface 140 operably connected to a terminal 142, and by a network interface 144 operably connected to a plurality of networked devices 146. The terminal 142 and networked devices 146 could be desktop or PC-based computers, workstations, network terminals, or other networked computer systems.

Illustratively, computer system 110 is shown for a multi-user programming environment that includes at least two processors, processor 112 and processor 124, which obtains instructions, or operation codes, (also known as opcodes), and data via a bus 130 from a shared main memory 116. Illustratively, each processor has its own cache and each cache may be coupled to a plurality of successive caches. Successive caches may be labeled as numerically sequential levels of cache such as level one (L1), level two (L2), etc. as they extend from the processor. As an illustration, processor 112 is coupled to cache 114 and processor 124 is coupled to cache 126. Although shown as single entities, the caches 114 and 124 are representative of any number of levels of cache. In general, the processors 112 and 124 may be any processors configured to support the aspects of the present invention. In particular, the computer processors 112 and 124 are selected to support monitoring of processor cache. Illustratively, the processors are PowerPC processors available from International Business Machines, Inc. of Armonk, N.Y.

The main memory 116 could be one or a combination of memory devices, including Random Access Memory, non-volatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 130.

Illustratively, the main memory 116 includes an operating system 118, and a computer program 120. As an illustration, the operating system 118 contains a cache purge instruction 128 which, when executed, purges a cache line from the cache of one of the processors in computer system 110 and sends the cache line to one or more other processor in computer system 110. Although the instruction 128 is shown as a part of the operating system 118, the instruction 128 may be contained in the computer program 120 or in any other executable program.

Figure 2:
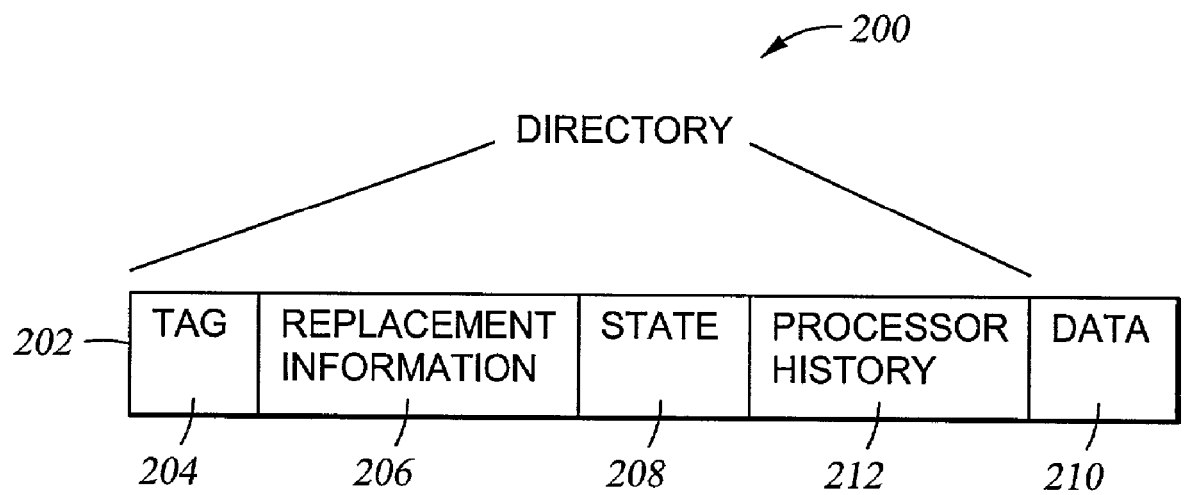
FIG. 2 illustrates a diagram of a cache directory.

FIG. 2 illustrates one embodiment of a cache directory 200. In some embodiments, the cache directory 200 may be configured as is known in the art. In general, the cache directory 200 contains information about which caches contain which memory locations. A cache line comprises data stored in a cache referenced by a cache directory entry. The cache directory is queried before any change to a cache line is initiated. When an entry in the cache is changed or modified, the directory updates, invalidates or temporarily invalidates the respective directory entry corresponding to the cache line.

FIG. 2 illustrates a cache line 202 comprising a cache directory and data 210. As an illustration, the cache directory 200 comprises a tag 204, replacement information 206, state 208 and a processor history 212. The tag 204 is a portion of the address in main memory 116 that is used to identify the data 210 stored in main memory 116. The replacement information 206 contains historical information about the age of the cache line 202. In one embodiment, the replacement information 206 could be the amount of system processing cycles that have elapsed since the last time the cache line was accessed by the system. In another embodiment, the replacement information 206 could be a system time stamp indicating when the cache line was first created or last modified. The state field 208 indicates the status of the cache line 202. Illustratively, the state of the cache line 202 could be modified, exclusive, shared or invalid. A modified state indicates that the data 210 referenced by the tag 204 has been changed. An exclusive state indicates that the memory location exists in only one cache and can be modified by the corresponding processor. A shared state indicates that multiple copies of the memory location may exist. An invalid state indicates that the cache line 202 no longer contains current useful information and may be overwritten by a new cache line entry. The processor history 212 contains information identifying the last processor that previously used the cache line. In one embodiment, the information may be any numerical or alpha numerical data used to uniquely identify a processor.

The method for purging and updating cache lines comprises a state called "temporarily invalid" that may be entered into the state field 208 of the cache directory 200. Illustratively, the temporarily invalid state indicates that the cache line 202 once held the memory location indicated by the tag 204 but is currently being accessed exclusively by another processor that requested the cache line 202 exclusively. While the cache line 202 is in a temporarily invalid state, the cache line will not be overwritten by a new cache entry. A new cache entry will first replace a cache line that is in an invalid state. If no cache lines are in an invalid state, the new cache entry will replace the oldest cache line 202 as indicated by the historical information contained in the replacement information 206. The temporarily invalid cache line will only be overwritten if the replacement information 206 indicates that the temporarily invalid cache line is the oldest cache line.

Figure 3:
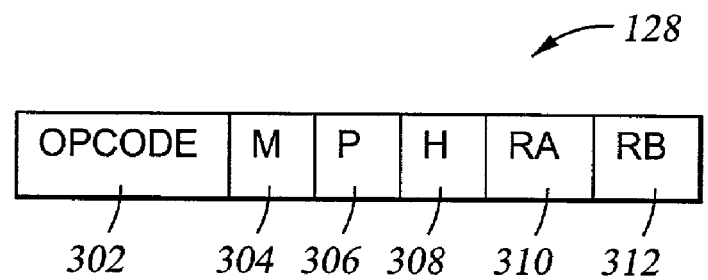
FIG. 3 illustrates an instruction used to purge a cache line from one processor and provide the cache line to another processor.

FIG. 3 illustrates one embodiment of a cache purge instruction 128 used to purge a cache line addressed in field "RA" 310. Illustratively, the cache purge instruction 128 is an X-form PowerPC instruction 128 and the opcode 302 may be any notation recognized by a processor to execute the instruction. For example, the opcode 302 may be represented by a hexadecimal notation. The field "M" contains information regarding which processor(s) and their associated caches will be updated and may contain a value equal to "0" or "1". For example, if the field "M" 304 equals "0", then the processor and its associated cache referenced by a processor number stored in field "RB" 312 is updated. Further, if the processor number stored in field "RB" 312 is the processor that is executing the instruction 128, then all processors and their associated caches are updated. If field "M" 304 equals "1", the processor chosen to be updated is determined based on the processor history 212 shown in FIG. 2. Referring back to FIG. 3, the field "H" 308 indicates the cache level that is to be updated and may contain any numerical value representative of a level of cache. As an illustration, if field "H" contains "0" then the level one (L1) cache is updated and so on. The field "P" 306 contains a value that indicates under what circumstances each processor in the system performs an update write to its cache or caches while updating the state field 208 of the cache line 202 in the cache directory 200. As an illustration, if field "P" 306 equals "0", then all caches are updated and the state field 208 of the cache line addressed in field "RA" 310 is marked as shared. If field "P" equals "1", then the state of only one cache line at a designated processor is updated and marked exclusive while the issuing processor marks the cache line temporarily invalid. If field "P" equals "2" then all caches are updated and the cache line state is marked as temporarily invalid.

Figure 4:
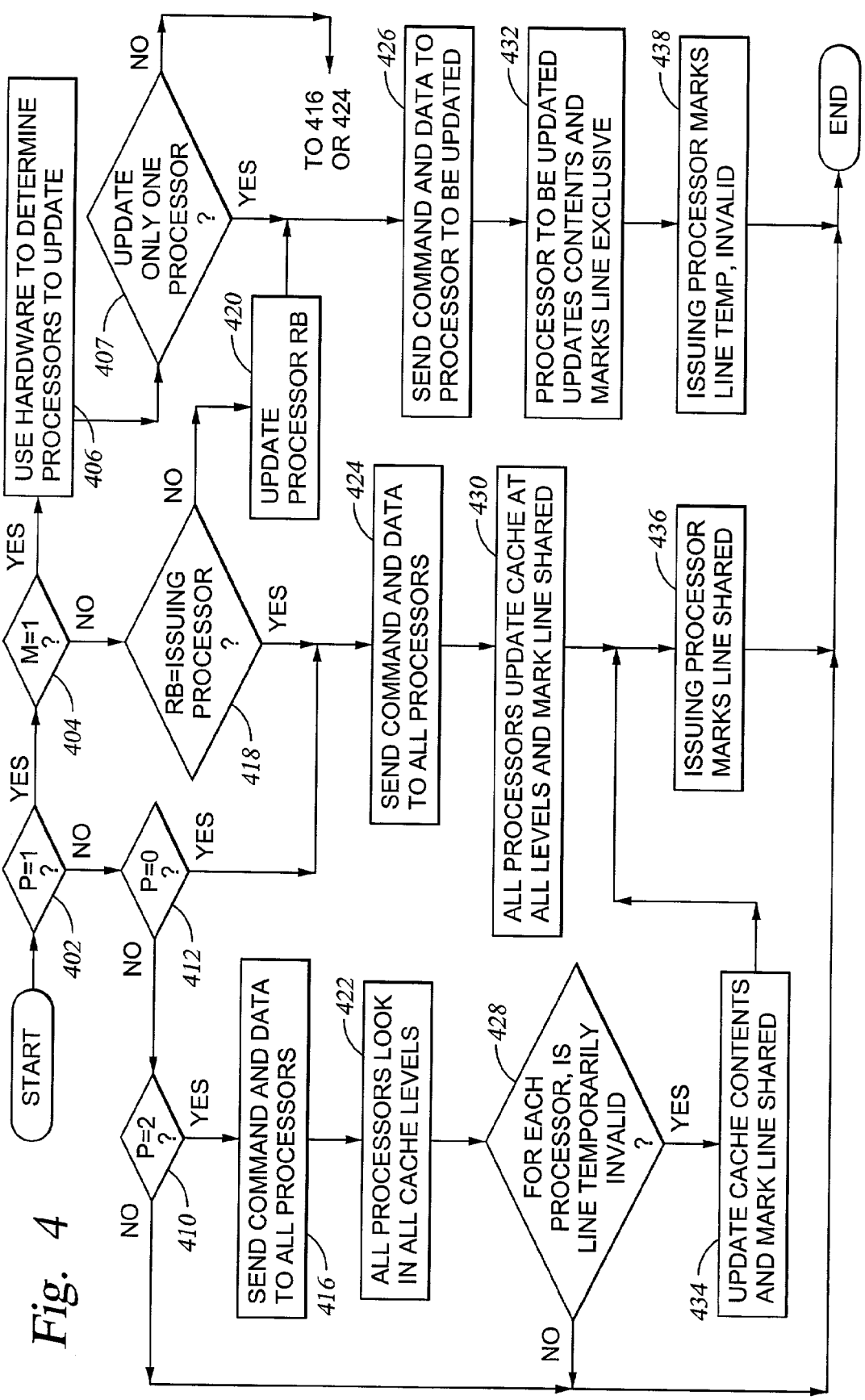
FIG. 4 shows a flow diagram of the method for purging and updating a cache line.

One embodiment illustrating a method of purging and updating a cache line is shown as a method 400 in FIG. 4. In one embodiment, the method 400 may be understood as illustrative of the operation of the system 110. The method 400 is entered at step 402 whenever the instruction 128 is executed. At step 402, the method queries if field "P" 306 equals "1" indicating that the state of only one cache line at designated processor is to be updated. If so, the method proceeds to step 404 where the method queries if field "M" 304 equals "1" indicating that the processor chosen to be updated is determined based on the processor history 212 shown in FIG. 2. If so, the method 400 proceeds to step 406 where the system hardware is used to determine which processors to update based on processor history 212. This is accomplished by examining the processor history 212 in the cache directory 200 to find the processors that previously used the cache line. In one embodiment, only one processor is selected to be updated. For instance, the processor referenced to the oldest cache line is selected as the processor to be updated. In an alternative embodiment, more than one processor may be selected by hardware to be updated. The method then proceeds to step 407 where a decision is made as to whether only one processor is to be updated. If only one processor is to be updated, the method then proceeds to step 426 where an update command along with updated data are sent to the processor determined to be updated. In one embodiment, if there is no processor or if there is more than one processor selected to be updated, the method proceeds to step 416. In an alternative embodiment, if there is no processor or if there is more than one processor selected to be updated, the method proceeds to step 424. At step 432, the processor determined to be updated updates its cache contents and marks the cache line exclusive. This is because the processor to be updated is the only processor that has this cache line to be updated. At step 438, the processor executing the instruction 128, marks its cache line temporarily invalid.

If, at step 404, the answer to the query is in the negative meaning that field "M" equals "0, the method then proceeds to step 418 where the method 400 queries if field "RB" 312 equals the processor executing the instruction 128. If not, the method proceeds to step 420 where only the processor contained in field "RB" 312 is updated. The method 400 then proceeds to step 426. If at step 418 it is found that the "RB" 312 equals the processor executing the Instruction 128, then the method proceeds to step 424 where an update command along with updated data is sent to all processors. At step 430, all processors update their caches at all levels and mark the cache line as shared. At step 436, the processor executing the Instruction 128 marks its cache line as shared.

If at step 402, field "P" 306 does not equal "1", then the method 400 proceeds to step 412 where the method queries if field "P" 306 equals "0". If so, the method proceeds to step 424, which has been described above. If not, the method proceeds to step 410 where the method 400 queries if field "P" 306 equals "2". If so, the method proceeds to step 416 where an update command along with updated data is sent to all processors. At step 422, each processor in the system looks at the state of the cache line in all of their cache levels. At step 428, the method 400 queries if the state of the cache line is marked as temporarily invalid. If so, the method 400 updates the contents of the cache line marked temporarily invalid and marks the line as shared. The method then proceeds to step 436.

In one embodiment, a processor may execute the instruction 128 after the processor executes at least one store instruction. The value of field "M" 304, field "P" 306, field "H" 308, field "RA" 310, and field "RB" 312 may be selected to ensure that other processors have a copy of the data of the store instruction.

For instance, assume a first processor executes a store instruction to put data 1234H to memory address [56789H] (square brackets indicate the enclosed number is a memory address). Assume further it is known that a second processor will soon reads data from memory address [56789H]. To improve the performance of the second processor, the first processor may execute an instruction 128 after the first processor executes the store instruction. For the instruction 128, field "RB" 312 can hold the processor number of the second processor. Field "M" 304 can be 0 so that the second processor whose processor number is in field "RB" 312 is selected to be updated. Field "P" 306 can be 1 so that only the second processor is selected to be updated. Field "H" 308 can be 0 so that an L1 cache of the second processor is updated.

Relating the method of FIG. 4 to the above example, in step 402, because field "P" 306 is 1, the method proceeds to step 404. In step 404, because field "M" 304 is 0, the method proceeds to step 418. In step 418, because field "RB" 312 contains the processor number of the second processor, not the issuing, first processor, the method proceeds to step 420. In step 420, only the second processor is updated. In step 426, a command and data 1234H are sent to the second processor via bus 130. In step 432, the second processor updates a cache line of its L1 cache for the memory address [56789H] and marks the cache line Exclusive. In step 438, the first processor marks as Temporary Invalid its cache line for memory address [56789H]. As a result, when the second processor reads the most current data 1234H from memory address [56789H], the data is present in its L1 cache and a cache read miss is avoided. Therefore, performance of the second processor is improved leading to performance improvement of the entire system 110.

While the foregoing is directed to embodiments of the present invention, other and further embodiments of the invention may be devised without departing from the basic scope thereof, and the scope thereof is determined by the claims that follow.

What is claimed is:

1. A method of managing cache in a shared memory multiple processor computer system, comprising:
executing, by a processor, a cache purge instruction that configures the processor to purge a cache line from the processor and send the cache line to at least one of a plurality of processors in the shared memory multiple processor computer system to update the at least one of a plurality of processors.

2. The method of claim 1, wherein the step of executing, by a processor, a cache purge instruction is performed after modifying the cache line by the processor.

3. The method of claim 1, wherein the cache line has a unique address.

4. The method of claim 1, wherein the cache purge instruction updates all processors in the computer system.

5. The method of claim 1, wherein the cache purge instruction updates only an oldest cache line.

6. The method of claim 1, wherein the cache purge instruction updates at least one level of cache.

7. A computer system, comprising a shared memory and at least two processors wherein each processor is associated with at least one level of cache and wherein each processor, when executing a cache purge instruction is configured to:
purge a cache line from the processor executing the cache purge instruction and send the cache line to at least one other processor in the computer system to update the at least one other processor.

8. The system of claim 7, wherein the processor is further configured to execute the cache purge instruction after the processor modifies the cache line.

9. The system of claim 7, wherein the cache purge instruction has a unique operations code.

10. The system of claim 7, wherein the cache purge instruction is referenced to at least five field fields.

11. The system of claim 10, wherein one of the at least five field fields indicates which processors will be updated by the cache purge instruction.

12. The system of claim 10, wherein one of the at least five fields indicates which level of cache will be updated by the cache purge instruction.

13. A tangible signal bearing medium comprising a program which, when executed by a processor in a shared memory multiple processor computer system performs an operation for managing cache, the operation comprising:
executing a cache purge instruction that will purge a cache line from the processor and send the cache line to at least one of a plurality of processors in the computer system to update the at least one of a plurality of processors.

14. The signal bearing medium of claim 13, wherein executing a cache purge instruction is after the processor modifies the cache line.

15. The signal bearing medium of claim 13, wherein the cache line has a unique address.

16. The signal bearing medium of claim 13, wherein the cache purge instruction updates all processors in the computer system.

17. The signal bearing medium of claim 13, wherein the cache purge instruction updates only the oldest cache line.

18. The signal bearing medium of claim 13, wherein the cache purge instruction updates at least one level of cache.

19. A method of managing cache in a shared memory multiple processor computer system, comprising:
executing, by a processor, a cache purge instruction that configures the processor to purge a cache line from the processor and send the cache line to at least one of a plurality of processors in the shared memory multiple processor computer system to update the at least one of a plurality of processors, wherein the cache purge instruction updates all caches in the computer system and marks a state of all updated cache lines as shared.

20. A method of managing cache in a shared memory multiple processor computer system, comprising:
executing, by a processor, a cache purge instruction that configures the processor to purge a cache line from the processor and send the cache line to at least one of a plurality of processors in the shared memory multiple processor computer system to update the at least one of a plurality of processors, wherein the cache purge instruction updates all caches in the computer system and marks a state of all updated cache lines as temporarily invalid.

21. A method of managing cache in a shared memory multiple processor computer system, comprising:

executing, by a processor, a cache purge instruction that configures the processor to purge a cache line from the processor and send the cache line to at least one of a plurality of processors in the shared memory multiple processor computer system to update the at least one of a plurality of processors, wherein the cache purge instruction updates only one cache at a designated processor of the plurality of processors then marks a state of the cache line updated as exclusive at the designated processor and marks a state of the cache line as temporarily invalid at the processor executing the instruction.

22. The method of claim 21, wherein a cache line marked as temporarily invalid may not be updated.

23. The method of claim 22, wherein a cache line is marked as temporarily invalid because another processor in the computer system requested the cache line marked as exclusive.

24. A computer system, comprising a shared memory and at least two processors wherein each processor is associated with at least one level of cache and wherein each processor, when executing a cache purge instruction is configured to:
   purge a cache line from the processor executing the cache purge instruction and send the cache line to at least one other processor in the computer system to update the at least one other processor, the cache purge instruction is referenced to at least five fields and one of the at least five fields indicates how the state of the updated cache(s) will be marked.

25. A tangible signal bearing medium comprising a program which, when executed by a processor in a shared memory multiple processor computer system performs an operation for managing cache, the operation comprising:
   executing a cache purge instruction that will purge a cache line from the processor and send the cache line to at least one of a plurality of processors in the computer system to update the at least one of a plurality of processors, wherein the cache purge instruction updates all caches and marks the state of the cache lines updated as shared.

26. A tangible signal bearing medium comprising a program which, when executed by a processor in a shared memory multiple processor computer system performs an operation for managing cache, the operation comprising:
   executing a cache purge instruction that will purge a cache line from the processor and send the cache line to at least one of a plurality of processors in the computer system to update the at least one of a plurality of processors, wherein the cache purge instruction updates only one cache at a designated processor of the plurality of processors then marks a state of the cache line updated as exclusive at the designated processor and marks a state of the cache line as temporarily invalid at the processor executing the instruction.

27. The signal bearing medium of claim 26, wherein a cache line marked as temporarily invalid may not be updated.

28. The signal bearing medium of claim 26, wherein a cache line is marked as temporarily invalid because another processor in the computer system requested the cache line marked as exclusive.

* * * * *